US010102208B2

(12) United States Patent
Law et al.

(10) Patent No.: US 10,102,208 B2
(45) Date of Patent: Oct. 16, 2018

(54) AUTOMATIC MULTIMEDIA SLIDESHOWS FOR SOCIAL MEDIA-ENABLED MOBILE DEVICES

(75) Inventors: Veronica Y. Law, Seattle, WA (US); Kathryn C. Lemson, Redmond, WA (US); Lejie Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/916,377

(22) Filed: Oct. 29, 2010

(65) Prior Publication Data

US 2012/0108293 A1 May 3, 2012

(51) Int. Cl.
*G06F 17/30* (2006.01)

(52) U.S. Cl.
CPC .............. *G06F 17/30056* (2013.01)

(58) Field of Classification Search
CPC .... G06F 1/1637; G06F 1/1647; G06F 1/1652; G06F 1/1656; G06F 17/30053; G06F 17/30056; G06F 17/30233; G06F 17/30241; G06F 17/3089; G06F 9/4445
USPC ........................................ 455/557, 573, 574
See application file for complete search history.

(56) References Cited

U.S. PATENT DOCUMENTS

| 5,959,621 A | 9/1999 | Nawaz et al. |
| 7,019,871 B2 * | 3/2006 | Risheq ......................... 358/474 |
| 7,503,059 B1 | 3/2009 | Rothschild |
| 7,711,774 B1 | 5/2010 | Rothschild |
| 7,734,318 B2 | 6/2010 | Goto |
| 7,783,703 B2 * | 8/2010 | Rafey et al. .................. 709/204 |
| 8,204,952 B2 * | 6/2012 | Stremel et al. ............... 709/213 |

(Continued)

FOREIGN PATENT DOCUMENTS

| CN | 1503138 A | 6/2004 |
| CN | 1783895 A | 6/2006 |

(Continued)

OTHER PUBLICATIONS

"Apple iPhone Cell Phone Review," published Jun. 29, 2007, http://www.wirelessinfo.com/content/apple-iphone-cell-phone-review/audio-quality.htm, 38 pages.

(Continued)

*Primary Examiner* — Natasha W Cosme
(74) *Attorney, Agent, or Firm* — Klarquist Sparkman, LLP

(57) ABSTRACT

Apparatus, computer-readable storage media, and methods are disclosed for allowing wireless communication device users to retrieve and view photographs, videos, and other media content using mobile computing platforms for display using a slideshow application. According to one disclosed embodiment, a method of performing a client-side slideshow application on a wireless communication device comprises, based on detecting that that wireless communication device is connected to a charging device, automatically invoking a slideshow application operable to display a series of images using the wireless communication device. The method further comprises transmitting a request for images via the Internet and receiving a series of images selected based at least in part on the request, adding at least one image from the series of images to an image playlist, and displaying at least a portion of the image playlist sequentially using the slideshow application on the wireless communication device.

24 Claims, 11 Drawing Sheets

(56) References Cited

U.S. PATENT DOCUMENTS

| | | | |
|---|---|---|---|
| 2004/0201774 | A1* | 10/2004 | Gennetten .................... 348/375 |
| 2006/0058079 | A1* | 3/2006 | Goto ........................ 455/575.3 |
| 2007/0168463 | A1 | 7/2007 | Rothschild |
| 2007/0250573 | A1 | 10/2007 | Rothschild |
| 2008/0033739 | A1 | 2/2008 | Zuckerberg et al. |
| 2008/0046976 | A1 | 2/2008 | Zuckerberg |
| 2008/0079654 | A1 | 4/2008 | Silverbrook |
| 2008/0209533 | A1* | 8/2008 | Abrams .............. G06F 17/3089 726/9 |
| 2009/0144392 | A1 | 6/2009 | Wang et al. |
| 2009/0198487 | A1 | 8/2009 | Wong et al. |
| 2009/0209286 | A1* | 8/2009 | Bentley ................ H04L 12/588 455/556.1 |
| 2010/0023506 | A1* | 1/2010 | Sahni ............... G06F 17/30876 707/E17.014 |
| 2010/0045567 | A1* | 2/2010 | Lin ...................... G06F 3/1454 345/1.1 |
| 2010/0049852 | A1 | 2/2010 | Whitnah et al. |
| 2010/0053075 | A1 | 3/2010 | Cohen et al. |
| 2010/0081475 | A1 | 4/2010 | Chiang et al. |
| 2010/0132049 | A1 | 5/2010 | Vernal et al. |
| 2010/0164957 | A1 | 7/2010 | Lindsay et al. |
| 2010/0169327 | A1 | 7/2010 | Lindsay et al. |
| 2010/0198581 | A1 | 8/2010 | Ellis |
| 2010/0306773 | A1* | 12/2010 | Lee et al. .......................... 718/1 |
| 2011/0183651 | A1* | 7/2011 | Mundy et al. ............. 455/414.1 |
| 2011/0190032 | A1 | 8/2011 | Sheldon et al. |
| 2012/0064946 | A1 | 3/2012 | Voetberg et al. |

FOREIGN PATENT DOCUMENTS

| | | |
|---|---|---|
| CN | 101166211 | 4/2008 |
| CN | 101617304 A | 12/2009 |
| JP | 2005227826 A | 8/2005 |
| WO | WO 2010/135174 A1 * | 11/2010 |

OTHER PUBLICATIONS

"Bedside Photo Frame," retrieved Jul. 2, 2010, http://appworld.blackberry.com/webstore/content/8932, 3 pages.

"DZ Photo Frame—Free," retrieved Jul. 2, 2010, http://appcrab.com/dz-photo-frame-free/, 5 pages.

"EFF on Gizmodo iPhone 4G Warrant, A Month with the iPad, Install Android on 1G iPhone and More," retrieved Jul. 2, 2010, http://lowendmac.com/inews/10inews/0503.html, 13 pages.

"Nokia 6500 Slide Camera Review," published May 17, 2008, http://www.smape.com/en/reviews/nokia/Nokia_6500_Slide-cam-rev.html, 16 pages.

"Slide Shows—Digital Picture Frames," published May 16, 2008, http://www.shortcourses.com/display/display1-9.html, 4 pages.

First Office Action from CN 201110346316.2, dated Dec. 3, 2013, 12 pages.

Summary of the Second Office Action, Chinese Patent Application No. 201110346316.2, dated Jun. 11, 2014, 13 pages.

Notice on Grant of Patent Right for Invention, Chinese Patent Application No. 201110346316.2, dated Sep. 29, 2014, 3 pages.

\* cited by examiner

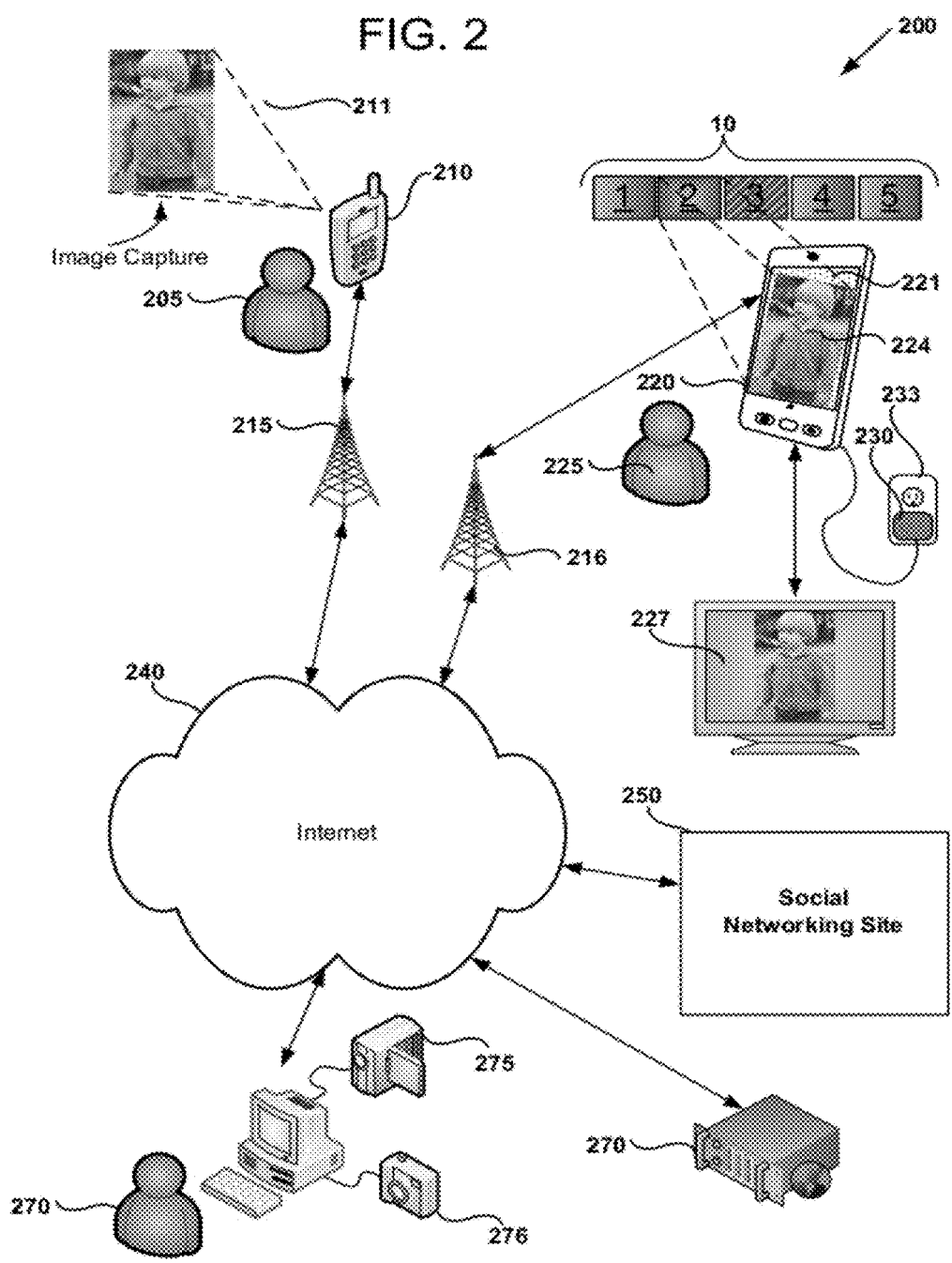

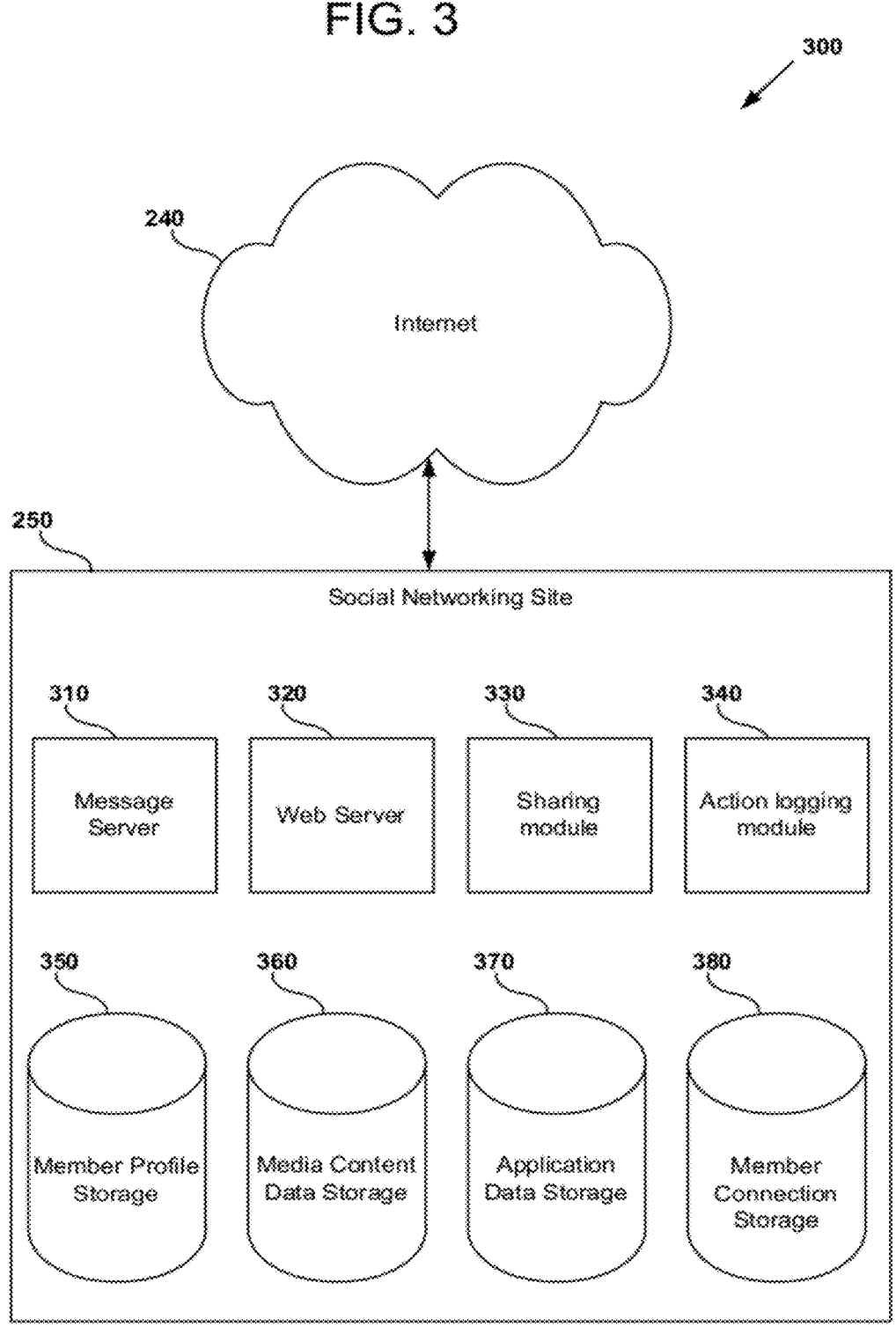

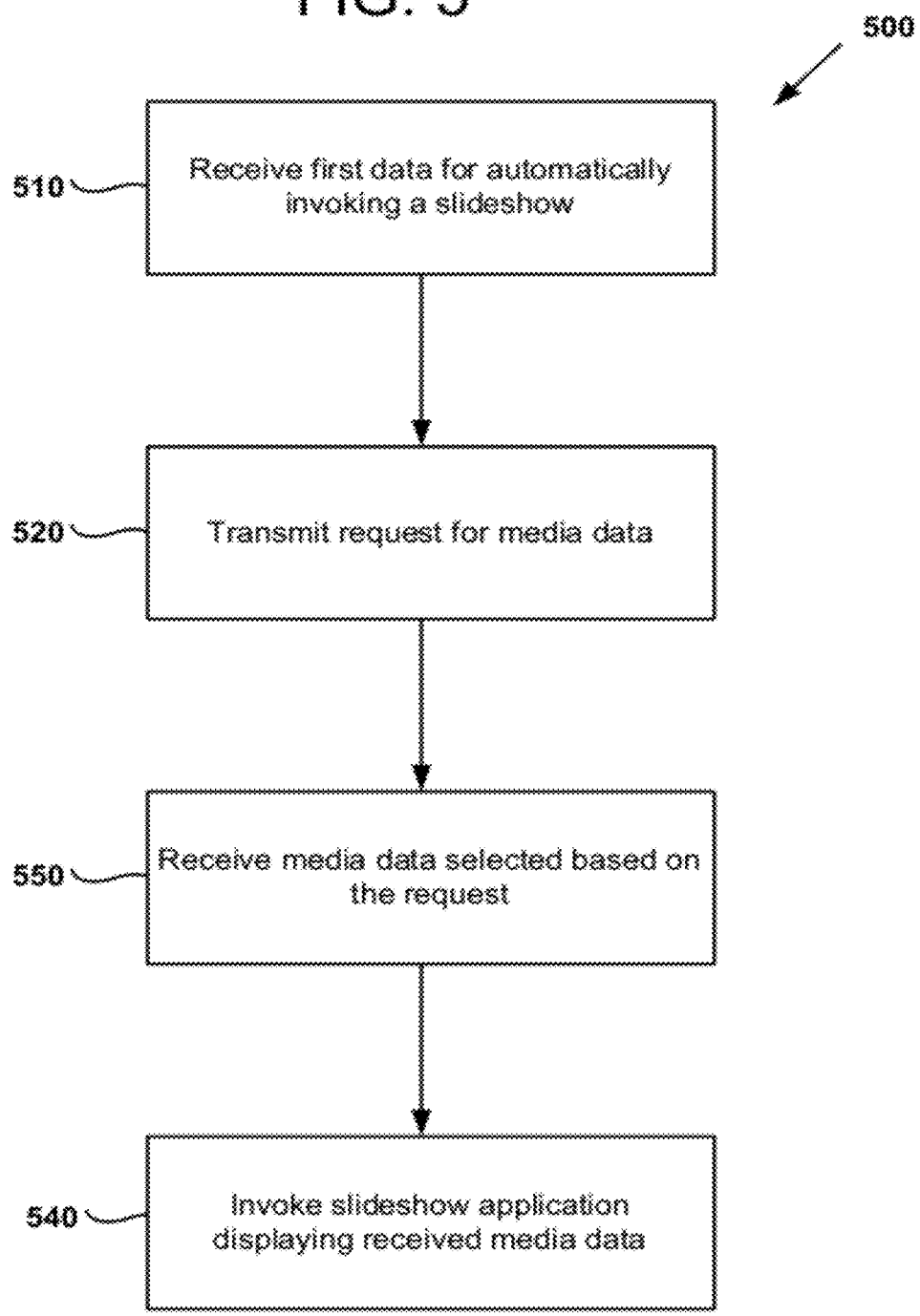

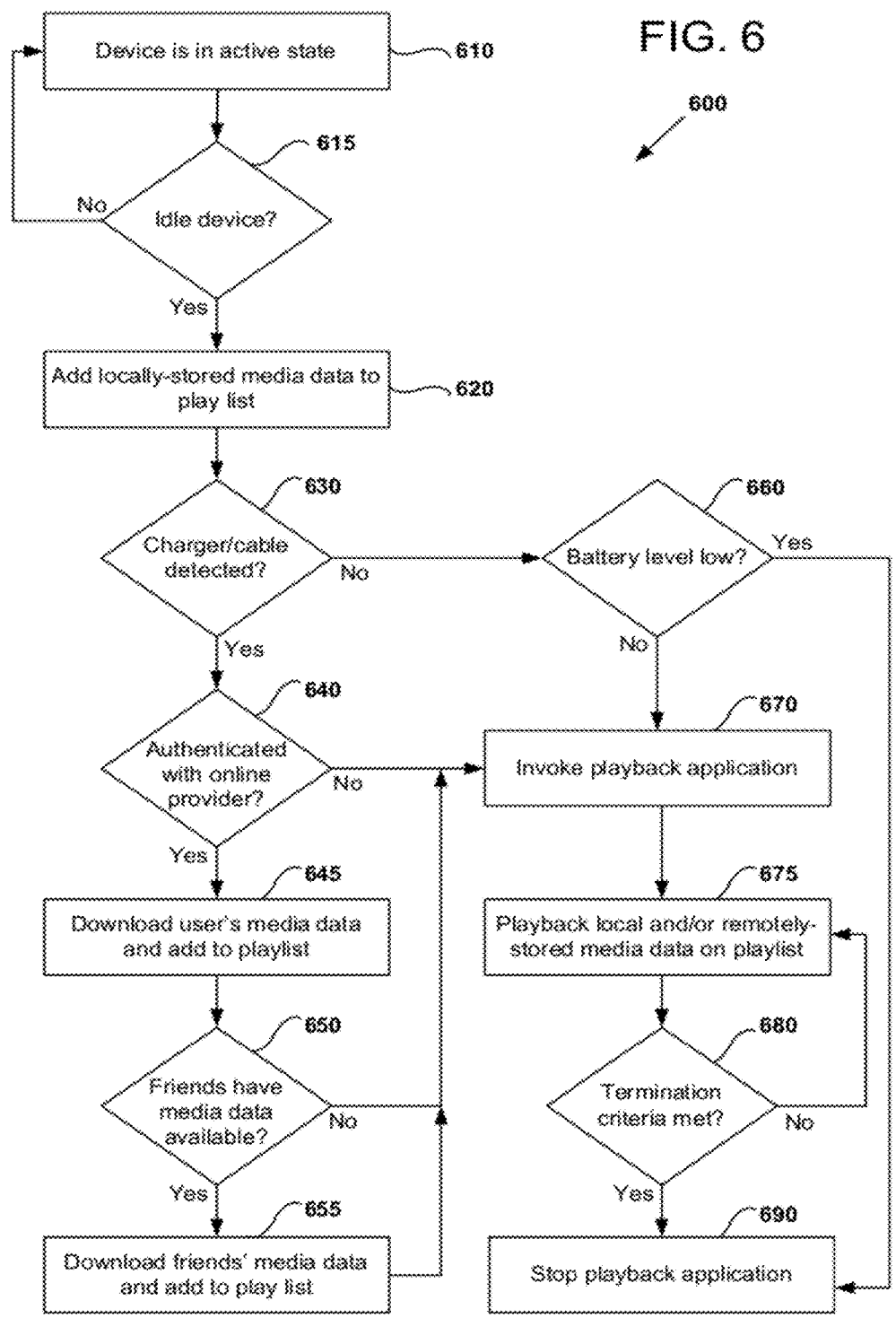

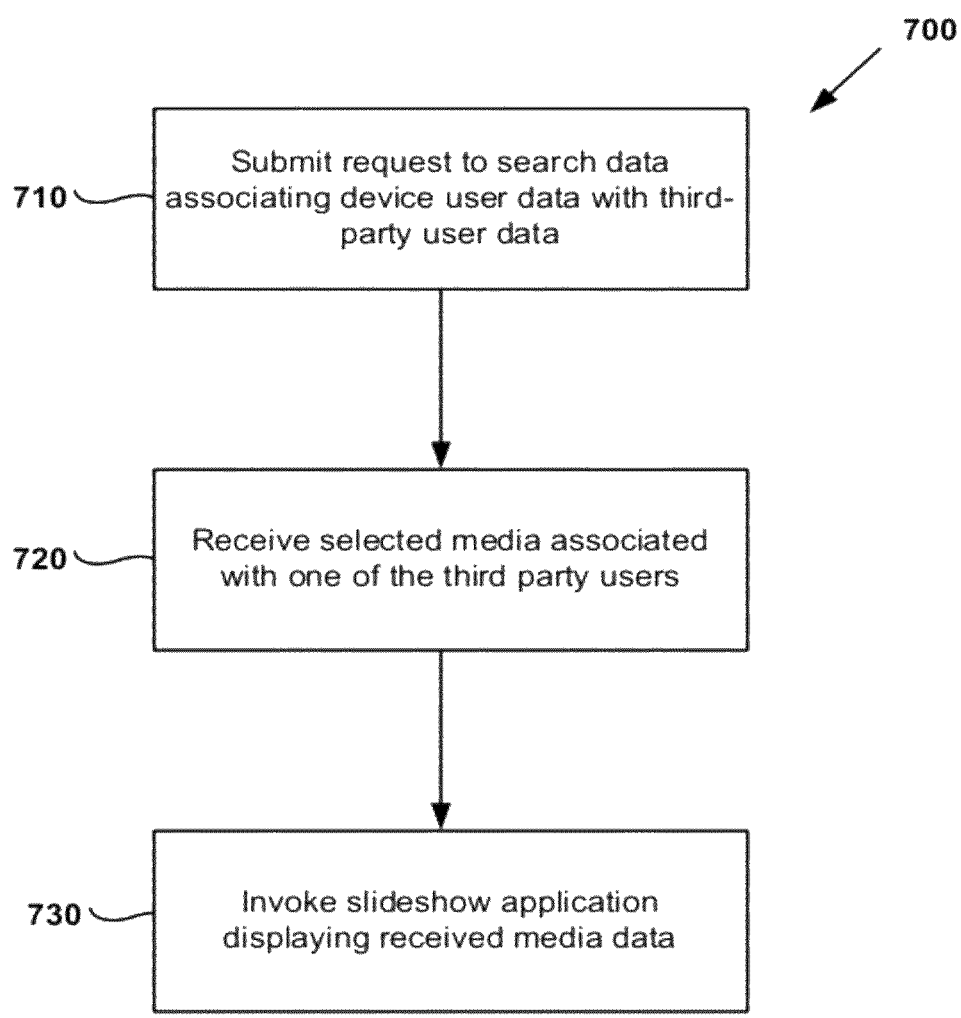

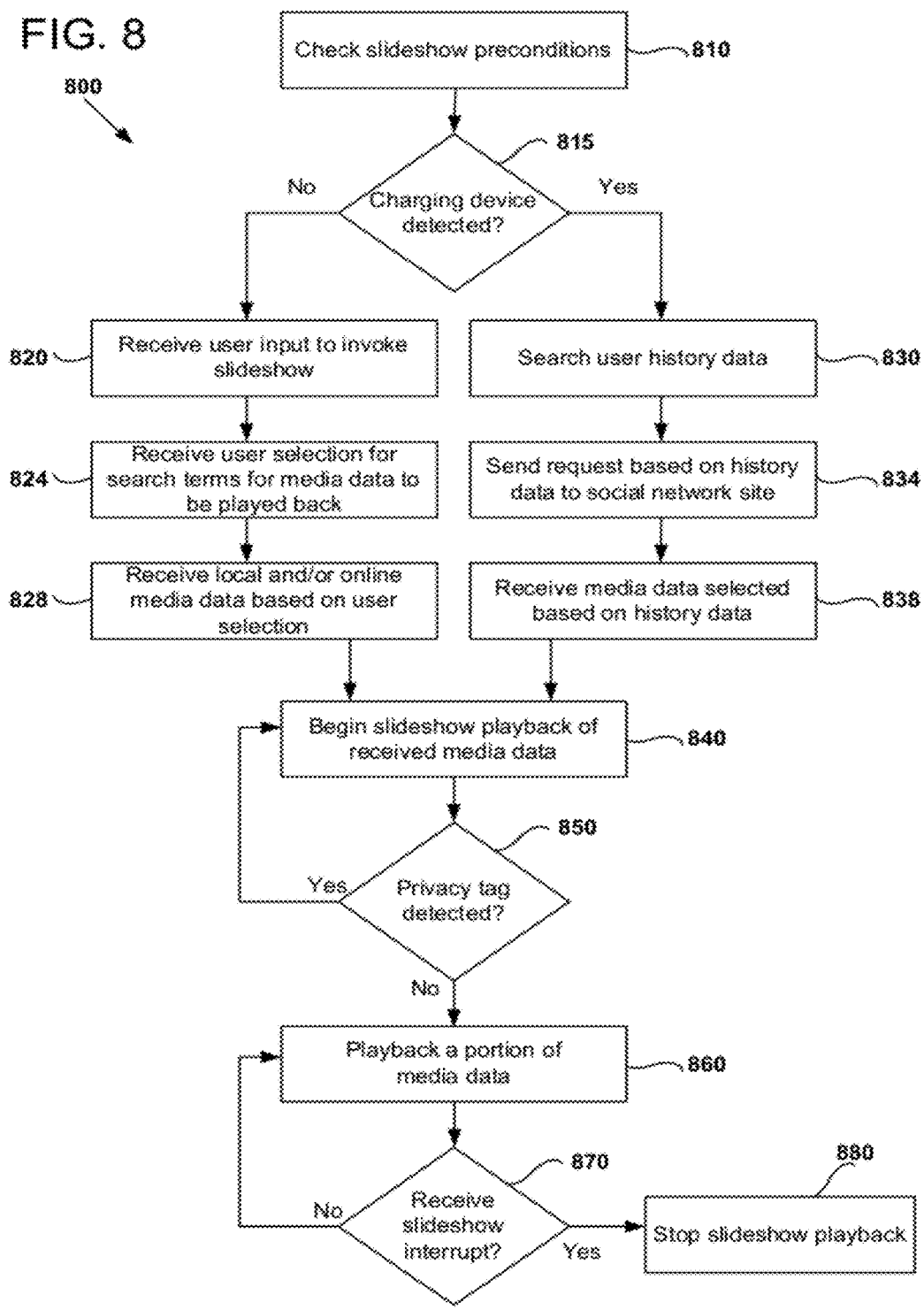

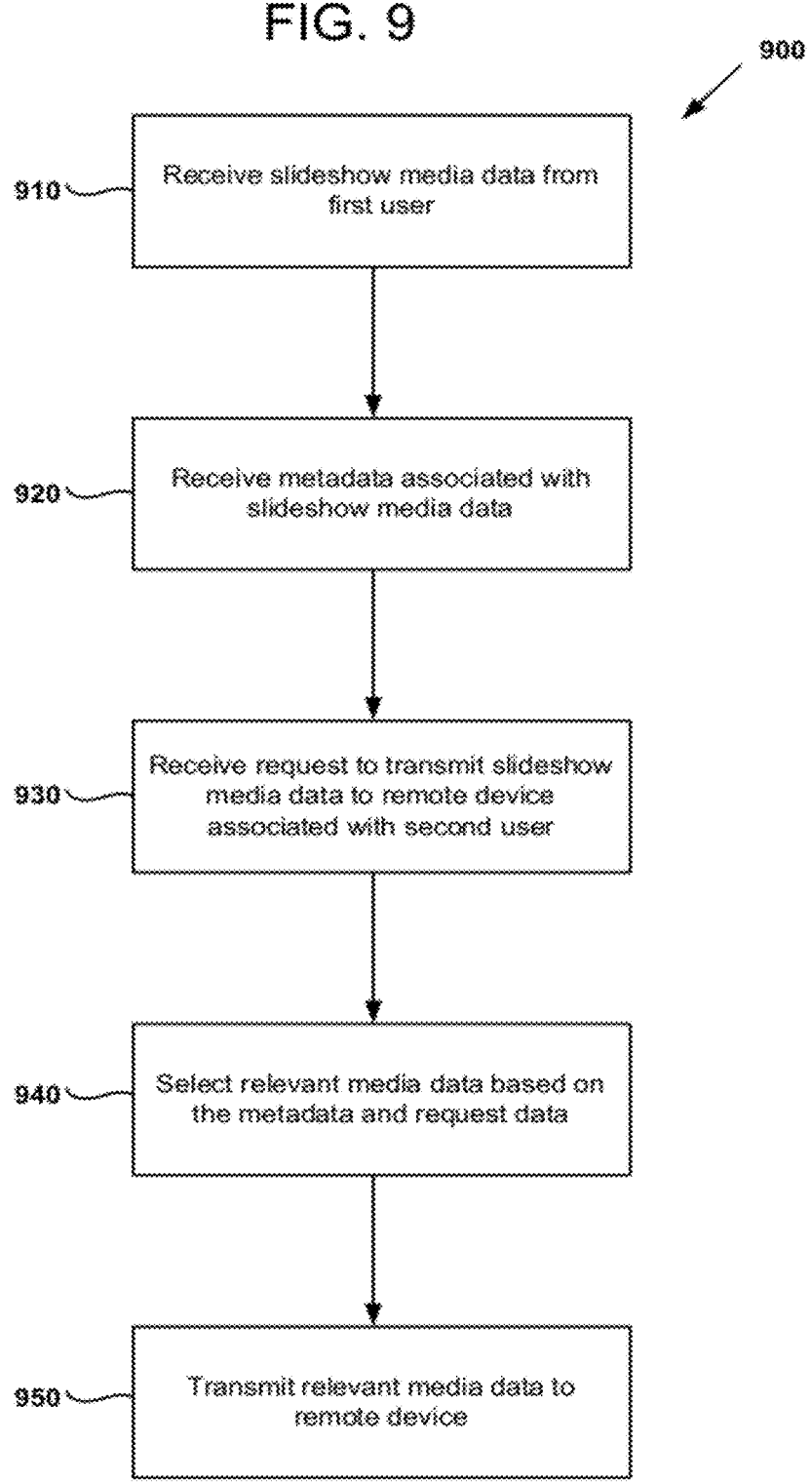

AUTOMATIC MULTIMEDIA SLIDESHOWS FOR SOCIAL MEDIA-ENABLED MOBILE DEVICES

FIELD

The present disclosure pertains to apparatus and methods for automatically presenting media from local or remote sources using a communications device.

BACKGROUND

With the increasing popularity of digital photography and videography using mobile computing platforms having access to social networking sites, there is a need for improving user experience by allowing easy presentation of digital photographs and video using mobile computing platforms, including cellphone devices, handheld devices, handheld computers, smartphones, and PDAs.

Current applications for photograph and video playback can be cumbersome, and require manual intervention in order to launch playback (e.g., photo or video slideshow applications) and to find or retrieve content that is desirable to a particular user.

Therefore, there exists ample opportunity for improvement in technologies to facilitate retrieval and presentation of digital photo and video images with wireless communication devices.

SUMMARY

Apparatus, computer-readable storage media, and methods are disclosed for allowing wireless communication device users to retrieve and view photographs, videos, and other media content using mobile computing platforms.

In one embodiment a method is disclosed for invoking a client-side slideshow application on a wireless communication device when a detection is made that the wireless communication device is connected to a charging device. Using the slideshow application, a series of images can be displayed. Images can be received from a network (e.g., the Internet) and streamed or downloaded to a client device for display in a playlist. Alternatively, the playlist can be a mixture of streamed images and stored images.

In yet another embodiment, if the charging device is disconnected from the client, the slideshow can automatically terminate.

In yet another embodiment, authentication can be used to authenticate the wireless communication device prior to receiving content from a network.

The foregoing and other objects, features, and advantages of the invention will become more apparent from the following detailed description, which proceeds with reference to the accompanying figures.

BRIEF DESCRIPTION OF THE DRAWINGS

FIG. 2 is a diagram depicting an exemplary computing environment suitable for implementing described embodiments, techniques, and technologies disclosed herein.

FIG. 3 is a diagram depicting a more detailed example of the social networking site depicted in FIG. 2.

FIG. 5 is a flow chart that outlines an exemplary method of receiving slideshow media data based on a request.

FIG. 6 is a flow chart that further details the exemplary method depicted in FIG. 5.

FIG. 7 is a flow chart that outlines an exemplary method of selecting media data associated with third-party users.

FIG. 8 is a flow chart that further details the exemplary method depicted in FIG. 7.

FIG. 9 is a flow chart that outlines an exemplary method of determining relevant media data based on received media data and metadata.

DETAILED DESCRIPTION

Figure 1:
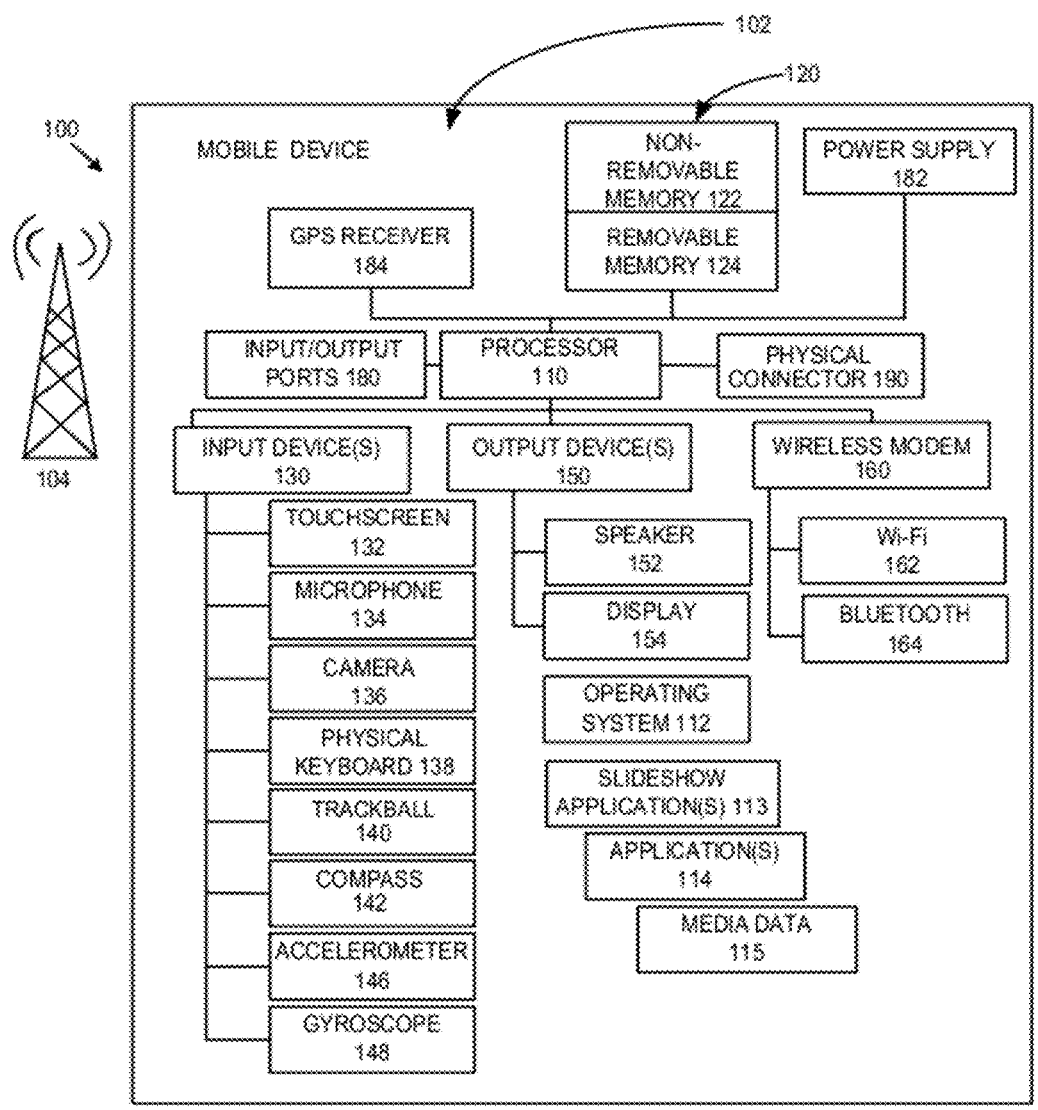
FIG. 1 is a system diagram depicting an exemplary mobile device, including a variety of optional hardware and software components.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

The described things and methods described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed things and methods can be used in conjunction with other things and methods. Additionally, the description sometimes uses terms like "produce," "generate," "select," "capture," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives)) and executed on a computer (e.g., any commercially available computer, including smartphones or other wireless communication devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In the following description, certain terms may be used such as "up," "down," "upper," "lower," "horizontal," "vertical," "left," "right," "over," "on," "near," and the like. These terms are used, where applicable, to provide some clarity of description when dealing with relative relationships. But, these terms are not intended to imply absolute relationships, positions, and/or orientations.

As used in this disclosure, "automatically" means that an act can occur after a previous act without the need to receive additional user input before initiating performance of the act.

As used in the disclosure, "application" includes programs implemented with computer-executable instructions executable by a wireless communication device, as well as programs where some or all of the application functionality is accessed over a network, for example, network applications or web applications.

I. Example Wireless Communication Device

FIG. 1 is a system diagram depicting an exemplary wireless communication device 100 including a variety of optional hardware and software components, shown generally at 102. Any components 102 in the wireless communication device can communicate with any other component, although not all connections are shown, for ease of illustration. The wireless communication device can be any of a variety of computing devices (e.g., a cell phone, smartphone, handheld computer, or Personal Digital Assistant (PDA)) and can allow wireless two-way communications with one or more mobile communications networks 104, such as a cellular or satellite network.

The illustrated wireless communication device 100 can include a controller or processor 110 (e.g., a signal processor, microprocessor, ASIC, or other control and processing logic circuitry) for performing such tasks as signal coding, data processing, input/output processing, power control, and/or other functions. An operating system 112 can control the allocation and usage of the components 102, and provide support for one or more slideshow application programs 113, application programs 114, and locally-stored media data 115. The application programs 114 can include common mobile computing applications (e.g., image-capture applications, email applications, calendars, contact managers, web browsers, messaging applications), or any other computing application.

The illustrated wireless communication device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the discovered applications 114. Example data can include media data, such as web pages, text, images, sound files, video data, or other data sets that can be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The wireless communication device 100 can support one or more input devices 130, such as a touch screen 132, microphone 134, camera 136, physical keyboard 138, trackball 140, compass 142, accelerometer 146, and/or gyroscope 148, and one or more output devices 150, such as a speaker 152 and one or more displays 154. Other possible output devices (not shown) can include piezoelectric or haptic output devices. Some devices can serve more than one input/output function. For example, touchscreen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Wi-Fi 162 or Bluetooth 164). The wireless modem 160 is typically configured for communication with one or more cellular networks, such as a GSM network for data and voice communications within a single cellular network, between cellular networks, or between the wireless communication device and a public switched telephone network (PSTN).

The wireless communication device 100 can further include at least one input/output port 180, a power supply 182, a satellite navigation system receiver 184, such as a Global Positioning System (GPS) receiver, and/or a physical connector 190, which can be a USB port, IEEE 1394 (FireWire) port, RS-232, or other suitable connector. The illustrated components 102 are not required or all-inclusive, as any components can be deleted and other components can be added.

The wireless communication device 100 can use multiple input sources for determining geospatial position, velocity, or orientation of the wireless communication device. For example, GPS receiver 184 can be used to determine geospatial coordinates by receiving signals transmitted from global positioning satellites. Alternatively, signals received from one or more mobile communications networks 104 (e.g., terrestrial communication networks) can be used to determine geospatial coordinates. In some examples, data received using GPS receiver 184 and one or more mobile communications networks 104 can be combined to provide more accurate geospatial position or orientation, and in a faster manner. In addition, the wireless communication device 100 can use data from one or more compasses 142, accelerometers 146 and/or gyroscopes 148 to calculate the orientation, velocity, and/or heading of the wireless communication device.

II. Example Implementation Environment

FIG. 2 depicts an example computing environment 200 suitable for implementing described embodiments, techniques, and technologies disclosed herein. As shown, a user 205 is holding a cellphone 210 (an example of a wireless communication device). In some examples, other platforms can be used, including but not limited to, mobile phones, smartphones, PDAs, handheld devices, handheld computers, PDAs, touch screen tablet devices, tablet computers, and laptop computers. In some examples, one or more of the platforms need not have access to a wireless (e.g., radio) communication connection, but can have access to a computer network using a wired connection, such as an Ethernet, DSL, or cable modem connection.

The cellphone 210 can receive global positioning data signals from one or more satellites (not shown). Other data for determining the location of the cellphone 210 can also be received or determined from one or more cell phone towers 215, a Wi-Fi access point, or a Bluetooth beacon. This location data can include, for example, a Service Set Identifier (SSID), Media Access Control (MAC) address, Bluetooth Device Address, or other data that can be used to determine location data for a Wi-Fi or Bluetooth access point.

The cellphone 210 can also acquire media data, such as photographs (e.g., an image 211), video, or audio recording using, e.g., a camera coupled to the smartphone, and submit the captured image to an online application (e.g., an online social networking application). The media data can be automatically uploaded to a social networking application and automatically shared with third-party users.

The cellphone 210 can also communicate with one or more servers located in a computing cloud 240 using a suitable communication network (e.g., a GSM data network employing a cell phone tower 215). The computing cloud 240 can store and read data by accessing, e.g., media content or data, media data, application data. The computing cloud 240 can communicate with one or more social networking sites 250. Examples of suitable social networking sites for implementing aspects of the disclosed technology include commercial sites such as Windows Live, MySpace, and Facebook.

The example computing environment 200 also shows a second user 225 carrying a smartphone 220 (an example of a wireless communication device). In some examples, other platforms can be used, including but not limited to, mobile phones, smartphones, PDAs, handheld devices, handheld computers, PDAs, touch screen tablet devices, tablet computers, and laptop computers. In some examples, one or more of the platforms need not have access to a wireless (e.g., radio) communication connection, but can have access to a computer network using a wired connection, such as an Ethernet, DSL, or cable modem connection. The smart phone 220 can include additional functions besides voice, e-mail, instant messaging, and text (SMS) messaging. For example, applications executing using the smart phone 220 can include photo and video capture, audio recording, speech recognition, office productivity applications, and slideshow applications.

The smartphone 220 is shown playing back media data using a slideshow application on a display mechanically coupled to the smartphone 220. As shown, media content 1, 2, 3, 4, and 5 are included on a playlist 10 for playback on a display 221 of the smartphone 220. The playlist can include content that is locally stored after being downloaded, content that is dynamically streamed while the playlist is sequencing, or a combination of both stored and streamed. The smartphone is depicted displaying a digital photograph 224 (an example of a still image) from a media data file 2. The media data files 1, 2, 3, 4, and 5 form a sequence 10 of image content, and include still image content 1, 2, 4, 5 and video content 3. In some examples, the smartphone 220 can display images on a display 227 coupled to the smartphone using a wired connection (e.g., an HDMI or VGA cable) or a wireless connection (e.g., an 802.11g connection or other suitable wireless connection).

The smartphone 220 can be configured to invoke the slideshow application automatically. For example, the smartphone 220 can automatically invoke the slideshow application after being connected to charging device, for example a DC power charger 230, which is plugged into a wall outlet 233. The power charger 230 need not have a physical cable, as in the case of inductive chargers. In other examples, the smartphone 220 can automatically invoke the slideshow application after being connected to a personal computer or other device, which act as charging devices, using power connections within a cable, such as a USB cable. In other examples, the smartphone 220 can automatically invoke the slideshow application after a pre-determined period of idle time.

In some examples, the smartphone 220 can also detect ambient light in an area of proximity to the smartphone and invoke the slideshow application based on the ambient light exceeding a pre-determined level, or stop a slideshow application based on the ambient light falling below a pre-determined level. In this manner, the smartphone 220 can display a slideshow while people in the room are likely to be awake (e.g., when room lights are on) and turn off the slideshow when people in the room are likely to be asleep (e.g., when room lights are off).

As shown, the computing environment 200 can include one or more media data providers 270 that upload media data from sources such as video cameras 275 and digital cameras 276 that can be hosted on the social networking site 250 and/or other websites 270. The uploaded media data can be downloaded from websites 270 and the social networking site by wireless communication device users 205 and 225 using the cell phone 210 and smartphone 220, respectively.

The social networking site 250 offers its members the ability to communicate and interact with other members of the social network. Members have accounts created on the social networking site 250 and provide authentication information to the site (e.g., a user ID and password, answers to challenge questions, or biometric data, such as a fingerprint) in order to establish their identity as a particular member. Members can join the social network and then add connections to a number of other members that they desire to be connected. Connections to groups and other members can be added by a member, for example, by the member sending an invitation request to another member, which when accepted allows the two members to become associated as "friends." Connections, such as friend connections, can also be automatically created by the social network based on common characteristics of the members or by members associating themselves with social networks or groups (e.g., members who are alumni of a particular university or who are fans of a particular sports team). As used herein, the term "friend" refers to any other member to whom a member has formed a connection, association, or relationship via the website. The connection between members may be a direct connection. However, in some examples, different degrees of connection are recognized by the social networking site 250. For example, "friends" and "friends of friends" (e.g., friends of a member's friends) represent two different degrees of connectivity. Also, the term "friend" does not necessarily require that members actually be friends in real life, but simply implies a connection in the social network. Privacy rights can be respected when using content for the slideshow. For example, content in the slideshow can be limited to content obtained from members that are associated as friends.

Such social networks can be implemented using various types of systems. Functionality provided by such social networks include allowing members to communicate with each other, form connections with each other, store information, and share information of interest, such as media data and/or references to media data. In some examples, a social network can include a website that provides access to members via computing devices using a web-based interface. In other examples, other protocols between member client devices and server applications can be used. In some examples, a social network can be implemented as a peer-to-peer system that allows members to communicate and perform other functions. One such example is a peer-to-peer network of smart phones communicating via Short Message Service (SMS) over a cellular network. In some examples, a social network can be implemented as one or more servers located in a computing cloud. The exemplary social networks described below can be adapted to various other implementations of social networking systems.

III. Example Social Networking Site

FIG. 3 is a block diagram 300 that illustrates an exemplary social networking site 250. As show, the social networking site 250 includes several components, including a message server 310, a web server 320, a sharing module 330, and an action logging module 340. As will be understood to one of ordinary skill in the art, the components 310, 320, 330, and 340 can be implemented on a single compute server, or on separate computer servers. The message server 310 can send and receive messages in various formats, including, for example, e-mail messages, text (SMS) messages, instant messages (IM), and voice messages. The web server 320 links the social networking site 250 to wireless communication devices 210 and 220 using a network connection, for example, an Internet connection. The web server 320 serves web pages, as well as other web-related content, for example, Java, Flash, and XML. The web server 320 can include other functionality for sending and receiving messages between the social networking site 250 and the wireless communication devices 210 and 220 as well as media data providers. The messages can include instant messages, e-mail, text messages, and http messages.

The sharing module 330 allows sharing of content from external website and/or media content providers 270 with members of the social networking site 250. The sharing module 330 can receive requests for content, such as media content, retrieve the content from external websites or media content providers 270, and transmit the content to the a cellphone 210 or smartphone 220 using wireless networks 215 and 216 coupled to those devices.

The action logging module 340 can receive messages from the web server 320 about member action on and off the social networking site 250. The action logging module 340 can record this history data, which can be used to determine relevant media content for playback using, for example, a slideshow application executing on a smartphone 220.

The social networking site 250 can also include data stores, for example, computer databases 350, 360, 370, and 380 for storing content and other information for performing various techniques disclosed herein. Member profile store 350 stores information about members, such as name, birthdate, location, as well as authentication information, for example, user ID and password information.

Media content store 360 stores media content, such as still images (e.g., photographs), video, and audio. The still images can be stored in any suitable format, including JPEG, GIF, BMP, RAW, or other suitable format. The video images can be stored in any suitable video format, including AVI, MPEG-2, MPEG-4, H.264, or VC-1. Audio data can be stored in any suitable audio format, for example, WAV, MP3, OGG, AAC, or WMA formats. In some examples, audio and video data is combined in a single format. Media data stores in the media content store 360 can be transmitted to external websites 270, to the cellphone 210, the smartphone 220, or other suitable media device for playback. Playback by cellphone 210 and smartphone 220 can include playback using an automatically-invoked slideshow application, as discussed herein.

Application data store 370 stores source code and executable computer-readable instructions for implementing applications in accordance with the disclosed technology. In some examples, executable code can be downloaded by a wireless communication device (e.g., cellphone 210 or smartphone 220) for execution locally on the device. In other examples, web-based applications are implemented using portions of HTML, DHTML, AJAX, or other suitable computer-readable instructions in combination with a web server located at the social networking site 250 or external website 270.

IV. Example Slideshow Applications

Figure 4A:
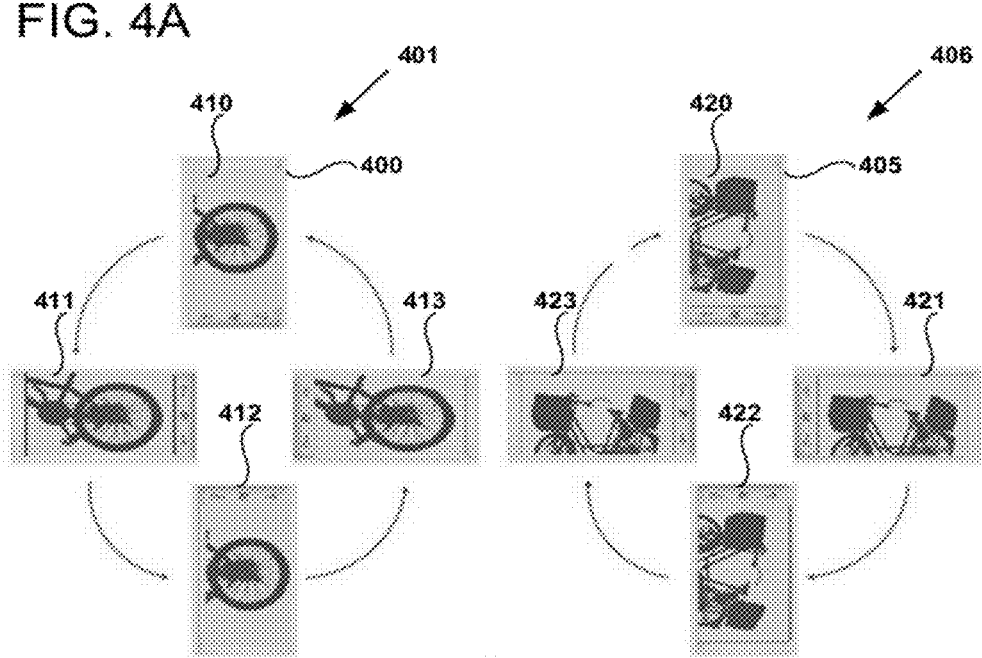
FIG. 4A is an illustration of two mobile devices displaying slide show applications while being rotated.

FIG. 4A is an illustration of a mobile device 400 executing 401 a slideshow application displaying a photographic still image and a mobile device 405 executing 406 a slideshow application displaying a video image as a user rotates the mobile devices. As shown, the mobile device 400 starts displaying a still image 410 while the device is in a portrait orientation. The mobile device 400 is then rotated 90° counter-clockwise to a landscape orientation, after which the image 411 is rotated accordingly, such that the image is displayed at the same orientation to the user. Rotating the mobile device 400 another 90° counter-clockwise places the device in a portrait orientation, after which the image 412 is rotated accordingly in order to maintain the same display orientation relative to the user. Next, the device is rotated another 90° counter-clockwise and the image 413 is again rotated accordingly. Finally, the device is rotated another 90° counter-clockwise and the image 410 is again rotated accordingly to the original orientation in order to maintain the same display orientation relative to the user.

FIG. 4A also shows a mobile device 405 executing 406 a slideshow application displaying a video image as a user rotates the mobile devices. As shown, the mobile device 405 starts displaying a video image 420 while the device is in a portrait orientation. In contrast to the still image display, video images are displayed at an orientation such that the images are displayed in a landscape orientation regardless of device orientation. After the mobile device 405 is rotated 90° clockwise to a landscape orientation, the video image 421 is not rotated relative to the user, remaining in a landscape orientation relative to the device. Rotating the mobile device 401 another 90° clockwise places the device in a portrait orientation (which is 180° opposite the starting position), after which the video 422 is rotated accordingly in order to maintain the same display orientation relative to the user. Next, the device is rotated another 90° counter-clockwise and the image 423 is again rotated accordingly to maintain landscape orientation, but 180° opposite the orientation shown as video image 421. Finally, the device is rotated another 90° counter-clockwise and the image 420 is again rotated accordingly to the original orientation.

The rotation of the mobile devices 401 and 406 can be determined using an accelerometer 146 and/or gyroscope 148. As will be readily understood to one of ordinary skill in the art, the rotations of the mobile devices 401 and 406 need not occur in the order described. Instead, the mobile devices 401 and 406 will maintain relative orientation of the displayed images or video accordingly based on the current orientation of the device.

Figure 4B:
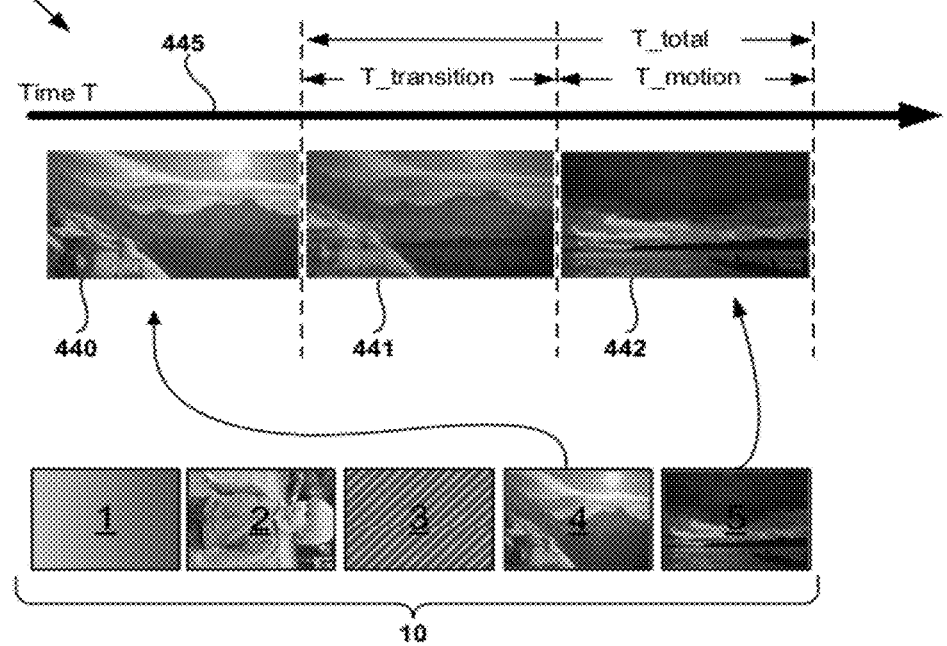
FIG. 4B is an illustration of a slideshow application displaying a sequence of images based on media content data.

FIG. 4B is an illustration 430 of an example slideshow application displaying a sequence 10 of still images 1, 2, 4, 5, and a video image 3, including a transition effect. As shown, the sequence 10 of images is displayed starting with image 1 and ending with image 5. Specifically, a timeline 445 indicates several periods of time relevant for a transition, including T_transition, T_motion, and T_total for a transition from image 4 to image 5. Prior to the start of T_transition, image 4 is displayed 440 with 0% transparency and without other images superimposed. During the T_transition period, the transparency of image 4 is gradually increased from 0% to 100%. As shown, image 5 is superimposed over image 4, and the transparency of image 5 is concurrently decreased from 100% to 0%. As shown at 441, each image 4 and 5 is at 50% transparency. After the slideshow has fully transitioned, image 5 is displayed at 0% transparency as shown. During the T_motion period, an additional motion effect is applied to the displayed image(s). For example, the display of the image can be panned and/or zoomed, thus adding a motion effect.

For the display of video images, such as video image 3, various techniques can be used to display the video image. In some examples, a selected image of series of images from the video image can be displayed. For example, the first frame, last frame, and/or both frames of video can be displayed during the T_transition and/or T_motion periods. In some examples, a selected frame (e.g., a frame selected by a creator or owner of the video image) can be displayed. In some examples, at least a portion of frames of the video image 3 can be played back.

In some examples of slideshow applications, audio playback can accompany playback of still images or video images. In some examples, the audio playback can be randomly selected from local and/or remote sources. In some examples, the audio playback is from media data selected used one or more of the techniques disclosed herein. For example, if a slideshow application is playing back media data associated with one of the user's friends, then additional media data associated with the user's friend can be played back during the slideshow. In other examples, locally stored media data can be combined with remotely stored media data during a slideshow. The slideshow application can also analyze the orientation of the mobile device and play both video and photos in a landscape orientation and only photo content in a portrait orientation.

V. Example Invocation of Slideshow Application Requesting Media Data

FIG. 5 is a flow chart 500 that outlines an exemplary method invoking a slideshow application, including receiving data for automatically invoking a slideshow, transmitting a request for media data, receiving media data based on the request, and invoking a slideshow displaying the media data, as can be used in certain embodiments of the disclosed technology.

At process block 510, first data is received for automatically invoking a slideshow application. In some examples, the first data is received based on a mobile device being connected to a charging device, such as a USB cable or docking station connected to a second device (e.g., a personal computer or other device suitable for deliver power through a USB cable) or a dedicated charger or docking station that provides power suitable for input to a power supply 182 of a mobile device (e.g., converting 120V AC or 12 V DC power to a suitable DC voltage for providing to the power supply). In some examples, the first data is received based on additional or other considerations, for example, context data, such as the current time, amount of ambient light, or data associated with a user calendar or other time-based schedule. Other features of the slideshow can be modified based on the context or environment (e.g., time-based decision making, calendar-based decision making, etc.) in which the slideshow is invoked. For example, if the slideshow was invoked after going into a sleep mode (due to lack of activity) and it is late at night, then volume can be muted or content can be analyzed to ensure that audio tracks are not played, based on an assumption that a user could be sleeping. Other algorithms can also be used for dynamically creating a slideshow that are calendar based. For example, for holidays (e.g., Halloween, Christmas, etc.), the algorithm for creating the slideshow can be changed, such as by collecting content within a predetermined time period before and/or after the holiday.

At process block 520, a request for media data is transmitted using, for example, a wireless modem 160, an I/O port 180, and/or a physical connector 190 (e.g., using a USB cable connected at process block 510). In some examples, the request is transmitted to a server located nearby a mobile device, while in other examples, the request is transmitted to a server located in a computing cloud 240. The request can include information describing media such as a list of desired filename(s), media genres, URLs, and can additionally include additional information describing user media preferences, time of data, or other data that can be used to process a media data request. In addition, data associated with members of a social network that are associated with a mobile device user can be included or referenced by the request.

At process block 530, media data is received, the media data being selected based on the transmitted request. For example, media data associated with a filename, keyword, or URL can be received.

At process block 540, a slideshow application is invoked, and at least a portion of the received media data is displayed. For example, if the received media data includes a series of photographs, the photographs can be displayed sequentially on a display. The slideshow can display media data stored locally or can display media data being streamed dynamically or a combination of both. Additionally, if a condition changes, such as conditions that invoked the slideshow change, the slideshow can automatically terminate. For example, if a cable is disconnected, the slideshow can terminate.

VI. Example of Invoking Slideshow Application

FIG. 6 is a flow chart 600 that further details the exemplary method shown in FIG. 5. At process block 610, a device, such as a mobile device, is an active state. When the device is in an active state, it can be performing functions such as sending/receiving voice data, sending/receiving IM, SMS, or other data, booting, or executing an application.

At process block 615, a check is performed to determine whether the device has entered an idle state. As readily understood by one of ordinary skill in the art, idle states can include some limited functionality, such as polling a communication network, but do not include other functionality designated as active, as described above regarding process block 610. If the device is not idle, the method proceeds back to process block 610 to perform the active function(s). If the device is determined to be idle, the method proceeds to process block 620.

At process block 620, locally-stored media data is added to a playlist for later playback by an application, e.g., locally-stored image data is added to a playlist for a slideshow application. The media data that is added can be selected based at least in part on context data, such as the time of day, user preferences, or previous user selections.

At process block 630, a check is made to determine whether a charger and/or data cable is connected to the device power supply. As discussed above regarding FIG. 2, suitable chargers can include dedicated chargers (with or without physical cables) or USB cables that act as chargers. If it is determined that a suitable charging device is not connected to the device power supply, then the method proceeds to process block 660. If it is determined that a charger or data cable is connected, then the method proceeds to process block 640.

At process block 640, a check is made to determine whether the device has been authenticated with an online media data provider. Such authentication can be determined using, for example, a user identifier and password, biometric, or geospatial location information. As will be understood by one of ordinary skill in the art, various techniques for encoding and transmitting authentication information, such as web browser cookies, basic web authentication, certificates, or other suitable forms of encoding and transmission, can be employed. If the device has not been authenticated, then the method proceeds to process block 670. If the device has been authenticated, then the method proceeds to process block 645.

At process block 645, remotely-stored data is downloaded and added to the playlist created at process block 620. The data stored can include media data, such as images, video, and/or audio data, as well as references to remote locations where data is stored for subsequent downloaded when the media data is to be played back. The references can be encoded as network addresses, such as URLs, ftp addresses, database indexes, friend connection references, groups, or other suitable reference for identifying media data content. In examples where no playlist is created at 620, a new playlist is created for the remotely-stored data.

At process block 650, the method checks to determine whether friends of the mobile device user have media content available. This check can be based not just on available friend content, but can also take into consideration dates associated with the friend media data, the frequency with which a friend's content has been previously accessed, or other data available to the social network site. If media data associated with one or more friends ("friend media data") is available, then the method proceeds to process block 655. Otherwise, if there is no friend media data available, the method proceeds to process block 670 to invoke playback.

At process block 655, friend media data is downloaded and added to the playlist created at process block 620. The data stored can include media data, such as images, video, and/or audio data, as well as references to remote locations where data is stored for subsequent downloaded when the media data is to be played back. The references can be encoded as network addresses, such as URLs, ftp addresses, database indexes, friend connection references, groups, or other suitable references for identifying media data content. In examples where no playlist is created at 620, a new playlist is created for the remotely-stored data.

At process block 670 at least one slideshow application is invoked to display at least a portion of the media content on the playlist. The invocation can include execution of locally-stored computer-readable instructions, the execution of remotely-stored computer-readable instructions (e.g., execution of instructions at a server in a computing cloud), or some combination of the two. In some examples, the slideshow application is integrated with other applications, for example, web browsers, video games, word processing, or other suitable applications. In some examples, other functions of a mobile device area disabled, such as turning off an LCD display backlight, in order to allow a brighter display during slideshow playback.

At process block 675, the invoked slideshow application(s) playback selected media data from the playlist. In some examples, the slideshow application can display a series of images from the playlist that were downloaded. In other examples, the slideshow application can display images that are dynamically streamed. In yet other examples, the slideshow application can intermix downloaded and dynamically streamed content. The images can be displayed using one or more displays (e.g., LCD displays coupled to a mobile device). For example, a series of digital images (stored using, e.g., JPEG, GIF, TIFF, or other suitable image formats) can be displayed sequentially on a display, each image being displayed for a pre-determined period of time (e.g., 30 seconds) before transitioning to the next image in the sequence. In some examples, additional transitional animations can be combined with the images to improve the aesthetics of the slideshow.

In some examples, the orientation of the display is considered during playback. For example, and as discussed above regarding FIG. 4A, the display of still images and video images can be rotated based on the current orientation of the display. In other examples, media content can be skipped based on the orientation of the display. For example, playback of video media data can be skipped when the display is in a portrait orientation.

At process block 680, the method determines whether one or more termination criteria have been met. For example, the termination criteria could include a time period for slideshow playback, reaching a predetermined time of day, playback of the media data a certain number of times, receiving a command to cease playback, receiving input requesting use of device functionality, battery charge level, or other suitable criteria. If the termination criteria have not been met, the method proceeds back to process block 675 to resume slideshow playback. If the termination criteria have been met, then the method proceeds to process block 690.

At process block 690, the media data playback by the slideshow application(s) is paused or stopped. In some examples, if the playback was interrupted based on receiving input data requesting a device function, the requested function can be automatically invoked. In some examples, the slideshow application is paused or stopped based on receiving a press of a hardware button or a button on a touch screen display. In some examples, the slideshow application is paused or stopped based on receiving an interrupt from another application, e.g., an incoming voice call or a reminder from a calendar application. In other examples, disconnecting a cable can automatically stop a slideshow.

VII. Example Invocation of a Slideshow Application Requesting Media Data

FIG. 7 is a flow chart 700 that outlines an exemplary method of submitting a request to search data associating a mobile device user with one or more third party users of an online application, receiving media data associated with at least one of the third party users, and invoking a slideshow application displaying the received media data, as can be used in certain embodiments of the disclosed technology.

At process block 710, a request is submitted to search data associated with a device user (e.g., the mobile device user invoking a slideshow application) with one or more third-party users of an online application. For example, the device user can be associated with one or more third party users by a friend connection created on a social networking site. In some examples, additional metadata associated with the device user and the third-party user(s) can be used as search terms and/or included in the data that is searched. In some examples, data associated with the current time on the device, ambient light, calendar data, or other suitable data can be used as search terms or included in the data that is searched. In some examples, the requested search can be performed at one or more remote servers located in a computing cloud. In some examples, all or a portion of the requested search is performed using a local device.

As discussed further above regarding FIG. 3, at least one the search terms and/or data to be searched can be stored in storage at a social networking site 250, for example, in databases 350, 360, 370, and/or 380.

At process block 720, media data is received, where the media data is selected based on the search performed at process block 710. For example, photographs or other still images recently posted by a third party user having a friend connection to the mobile device user are received as a result of the search. In other examples, video and/or audio data can be received. In some examples, the media data received includes an address, such as a URL, that describes one or more network locations from which to download the selected media data. In other examples, the selected media data is received directly as a result of the search at process block 720. After at least a portion of the media data is received, the method can proceed to process block 730. In some examples, the method waits until the selected media data has been completely received, while in other examples, the selected media data can be received concurrent with the playback at process block 730.

At process block 730, a slideshow application is invoked to display at least a portion of the received media data. As discussed herein, the slideshow is not necessarily limited to still images, but can include playback of video, audio, or other suitable media data. The slideshow can include transition or motion effects, and automatic rotation of the displayed media, as discussed at FIGS. 4A, 4B, and accompanying text. Further, the slideshow can begin before all of the media data has been received.

VIII. Example of Invoking Slideshow Application

FIG. 8 is a flow chart 800 that further details the exemplary method shown in FIG. 6. At process block 810, a check is made to determine if slideshow preconditions have been met before invoking the slideshow application. For example, device or user settings can be checked to determine whether the slideshow application is enabled. As another example, the state of the device, such as the time elapsed since last receiving user input or other application activity, such as running an active application or receiving a voice call or text message, can also be used as slideshow preconditions.

At process block 815, a check is made to determine whether a charging device is connected to the mobile device. Detection of a charging device (e.g., using a power or USB cable) is explained in more detail above. If a charging device is not detected as connected to the mobile device, the method proceeds to process block 820. If a charging device is detected, then the method proceeds to process block 830.

At process block 820, user input is received to invoke a slideshow application. For example, the user input can be received as touches on a touch screen display, hardware buttons, or voice command input. In some examples, movement of the device can be received as the user input; for example, by rapidly shaking the device, moving the device to a particular position or orientation, or moving the device to a particular geospatial location. In some examples, the absence of user input is treated as user input to invoke a slideshow application, for example, by not moving the device or not providing user input for a predetermined duration of time.

At process block 824, one or more user selections are received for search terms for media data to be played back. For example, the user selection can be a selection of a directory of images, a playlist, or keywords used to select media data. In some examples, all available media data can be selected. In some examples, the user selection can be coupled with other data, for example, context data for a mobile device representing current time, calendar data, the amount of ambient light, or other suitable context data.

At process block 828, media data are received based on the user selections received at process block 824. The media data can be received from local storage coupled to a mobile device, from remote storage associated with a remote server, or a combination of local and remote storage. In some examples, the remote server is located in a computing cloud and accessed using the Internet. After receiving at least a portion of the media data, the method proceeds to process block 840 to begin media playback. As discussed above regarding FIG. 7, media playback can begin before all of the selected media data has been received.

At process block 840, media playback begins, displaying at least a portion of the selected media data using a slideshow application. As discussed above, in some examples the media data is not limited to still images, but can include video and/or audio data as well.

If instead at process block 815, a charging device is detected, the method proceeds to process block 830. At process block 830, user history data is searched to determine media data that may be more relevant or desirable to the mobile device user. For example, user history data can include data based on previous communication between a mobile device user and other third-party users (e.g., friends connected to the user on a social network) or previously-received text messages, e-mails, or voice calls between the user and other parties. In some examples, all or a portion of the user history data is locally stored, while in other examples, all or a portion of the user history data is stored remotely, for example, at a server in a computing cloud.

At process block 834, a request is sent based on the user history data searched at process block 830 to social network site. In some examples, the user history data can include detailed data on user preferences, friend connections, and previous communications. In other examples, the user history data includes identifying information that can be used to identify the user at a remote server, and can be used to supplement or replace the user history data search performed at process block 830.

At process block 838, media data is received that has been selected based at least in part on the user history data search performed at process blocks 830 and/or 834. Similar to the techniques described at process blocks 828 or 645, the media data can include media data for playback, or references (e.g., network addresses) for media data to be retrieved locally and/or remotely. After receiving at least a portion of the media data, the method proceeds to process block 840 to begin media playback. As discussed above regarding FIG. 7, media playback can begin before all of the selected media data has been received.

After media playback begins at process block 840, the method proceeds to process block 850, where one or more tags, such as privacy tags or digital rights management (DRM) tags associated with the selected media data, are checked to determine if playback of some of the media data should be skipped. For example, media data can be tagged when uploaded to indicate a privacy or access list that should be allowed to view the media. Checking privacy tags before playback of media data may be desirable because the user may be less attentive during slideshow playback than during more active applications, and therefore more likely to be embarrassed by unflattering content. Furthermore, there may be other people able to view the slideshow that the user might not want to view media data with a privacy tag. For example, media data including photographs from a birthday party for a twenty-one year old might be less desirable to play back in an automatic slideshow than a birthday party for a five year old, especially if relatives or co-workers might view the slideshow.

For DRM tags, suitable authentication is performed to determine whether the user has permissions to playback the selected media data. For example, a user id and/or password can be used to authorize access to the selected media data. In other examples, an electronic DRM certificate issued to the user by a trusted authority and stored on the mobile device, or in a computing cloud, can be used. DRM permissions do not necessarily authorize all-or-nothing access, but can, for example, allow users to playback, but not record media data, or allow users to playback downloaded media data for a limited period of time.

If a tag is detected that indicates that a portion of the media data should not be played back, that portion of the media data is skipped and the method proceeds to process block 840. Otherwise, the method proceeds to process block 860. In some examples, the check for the privacy tag and/or DRM tags can be combined with an optional mode for the mobile device. For example, a slideshow application can have a photo frame mode and an interactive mode, where media data with a privacy tag or DRM tag is played back in interactive mode but not photo frame mode. In some examples, the determination of photo frame mode or interactive mode is determined based on how the slideshow application was invoked. For example, if the slideshow was invoked at process block 820, then the slideshow is determined to be in interactive mode, and additional content is available even if some of the media data has a privacy tag. If instead the slideshow was invoked at process block 830, then the slideshow is determined to be in photo frame mode, and the additional content with a privacy tag is not played back during the slideshow.

At process block 860, playback of the selected portions of media data that meet privacy tag requirements begins. As discussed above, this can include the sequential playback of images, video, and/or audio data. In some examples, the audio can be selected independently of images or video for playback concurrently while the images or video are being displayed. As the media data is played back, the method proceeds to process block 870.

At process block 870, a check is performed to determine if an interrupt has been received for stopping slideshow playback. An interrupt can be received based on: receiving user input on a mobile device, exceeding a time limit, performing playback of the media data a predetermined number of times, connecting or disconnecting a charging device, or other suitable condition. If a slideshow interrupt has not been received, the method proceeds to process block 860. If suitable conditions have been received for interrupting slideshow playback, the method proceeds to process block 880.

At process block 880, playback of media data using the slideshow application is stopped. In some examples, the slideshow can be resumed. In some examples, the slideshow application is exited and the method is terminated.

As will be readily understood to one of ordinary skill in the art, some or all of the acts performed at the process blocks described can be omitted, skipped, or reordered. For example, receiving user input to invoke the slideshow at process block 820, or user selection of search terms at process block 824, can be omitted in some examples. In some examples, the privacy tag check at process block can be performed before beginning slideshow playback at process block 840, or before receiving media data at process block 838.

IX. Exemplary Selection of Relevant Media Data

FIG. 9 is a flow chart 900 that outlines an exemplary method invoking a slideshow application, including receiving media data and associated metadata, receiving a request to transmit slideshow media data to a remote device, and selecting and transmitted selected media data to the remote device.

At process block 910, media data for playback using a slideshow is received from a first user. For example, the first user can be a member of a social network service and the slideshow media data can be still images such as photographs or other images. In some examples, the media data can include video and/or audio data. The media data can be stored in a database, for example, media content storage 360. In some examples, one or more references to locations of media data for playback are received instead of the media data itself.

In some examples, the media data for playback is recorded and uploaded by the first user automatically. For example, a user of a smartphone including an image capture feature or a video recording can configure the device to automatically upload photographs to, e.g., a social network site. Thus, the media data for playback is received automatically from the first user.

At process block 920, metadata is received that is associated with the media data received at process block 910. For example, the metadata can include data associating the media data with keywords describing the content of the data (e.g., "cooking," "birthday party," "beach," or "Seattle,"), geospatial location data (e.g., GPS coordinate describing where a photograph was capture or an area that the media data is particularly relevant to), or social network media data (e.g., metadata describing the media data as relevant to particular friends or groups of a social networking application). The metadata can be stored using, e.g., a database such as application data storage 370 or member connection storage 380 as part of a social networking site 250.

In some examples where media data is automatically received, the metadata can also be received from the same first user. For example, the first user might include a keyword describing the media content when creating or uploading the media data. In some examples, metadata can be created based on the geospatial location where the image(s) were captured. In some examples, metadata can be created based on time data or calendar data. For example, if a calendar indicates that the user is at a technical conference, the name of the conference can be added to the metadata. Thus, calendar entry data, including calendar appointment data, can be used as the metadata.

At process block 930, a request is received to transmit slideshow media data to a remote device associated with a second user. In some examples, the second user is not the same user as the first user discussed regarding process block 910. In some examples the request simply includes identification for the first user or the second user. In other examples, the request includes more detailed data, such as user history data or other data associating the first user and the second user.

At process block 940, media data is selected based on the request received at 930. The request data can be used to compare metadata associated with the slideshow media data, as well as other data describing relationships between the first user and the second user. For example, if the first user and second users are friends on a social network site, then the metadata may be designated as more highly relevant to the second user. As another example, if the second user appears in the first user's history data, the metadata may be designated as more highly relevant. Media data can then be determined as more or less relevant to the second user based on such comparison, and the more relevant media data thus can be selected based on the metadata and the request data.

At process block 950, the relevant media data is transmitted to the remote device. In some examples, a reference to the media data (e.g., a network address such as a URL) is transmitted, and the media data can be located and downloaded based on that reference. In other examples, the contents of the media data are transmitted to the remote device.

X. Example Computing Environment

Figure 10:
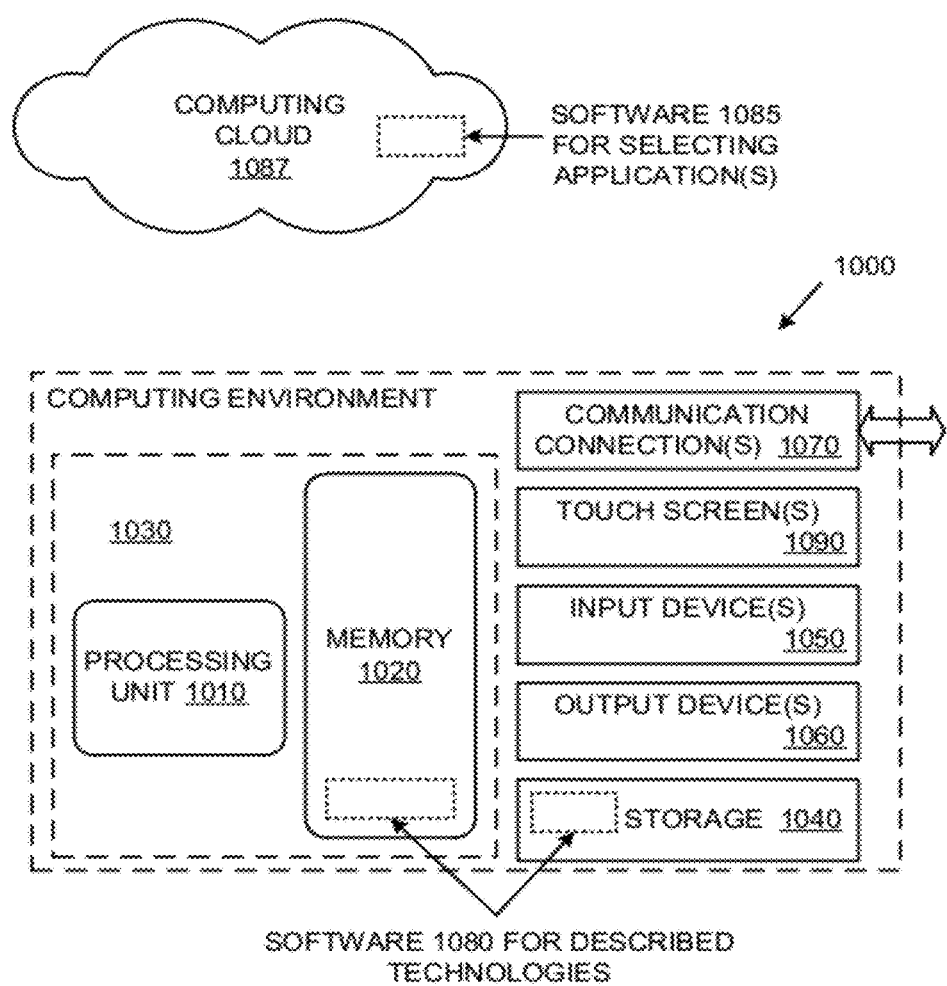
FIG. 10 illustrates a generalized example of a suitable computing environment in which described embodiments, techniques, and technologies can be implemented.

FIG. 10 illustrates a generalized example of a suitable computing environment 1000 in which described embodiments, techniques, and technologies may be implemented. For example, the computing environment 1000 can implement functionality for generating and transmitting context data, application metadata, and network addresses and computer-executable instructions for applications, as described herein.

The computing environment 1000 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules or instructions may be located in both local and remote memory storage devices.

With reference to FIG. 10, the computing environment 1000 includes at least one central processing unit 1010 and memory 1020. In FIG. 10, this most basic configuration 1030 is included within a dashed line. The central processing unit 1010 executes computer-executable instructions and may be a real or a virtual processor. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement the technologies described herein. A computing environment may have additional features. For example, the computing environment 1000 includes storage 1040, one or more input devices 1050, one or more output devices 1060, one or more communication connections 1070, and one or more touch screens 1090. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, flash memory, CD-ROMs, CD-RWs, DVDs, or any other non-transitory storage medium which can be used to store information, such as locally-stored media data, and that can be accessed within the computing environment 1000. The storage 1040 stores instructions for the software 1080, which can implement technologies described herein. Additional software 1085 for selecting applications using data, including media data, can be located in a computing cloud 1087.

The input device(s) 1050 may be a touch input device, such as a keyboard, keypad, mouse, pen, or trackball, a voice input device, a scanning device, ambient light source, image-capture device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, or another device that provides output from the computing environment 1000. The touch screen 1090 can act as an input device (e.g., by receiving touch screen input) and as an output device (e.g., by displaying a list of downloaded applications to notify a user).

The communication connection(s) 1070 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1000. By way of example, and not limitation, with the computing environment 1000, computer-readable media include memory 1020 and/or storage 1040. As should be readily understood, the term computer-readable storage media includes non-transitory storage media for data storage such as memory 1020 and storage 1040, and not transmission media such as modulated data signals.

XI. Example Implementation Environment

Figure 11:
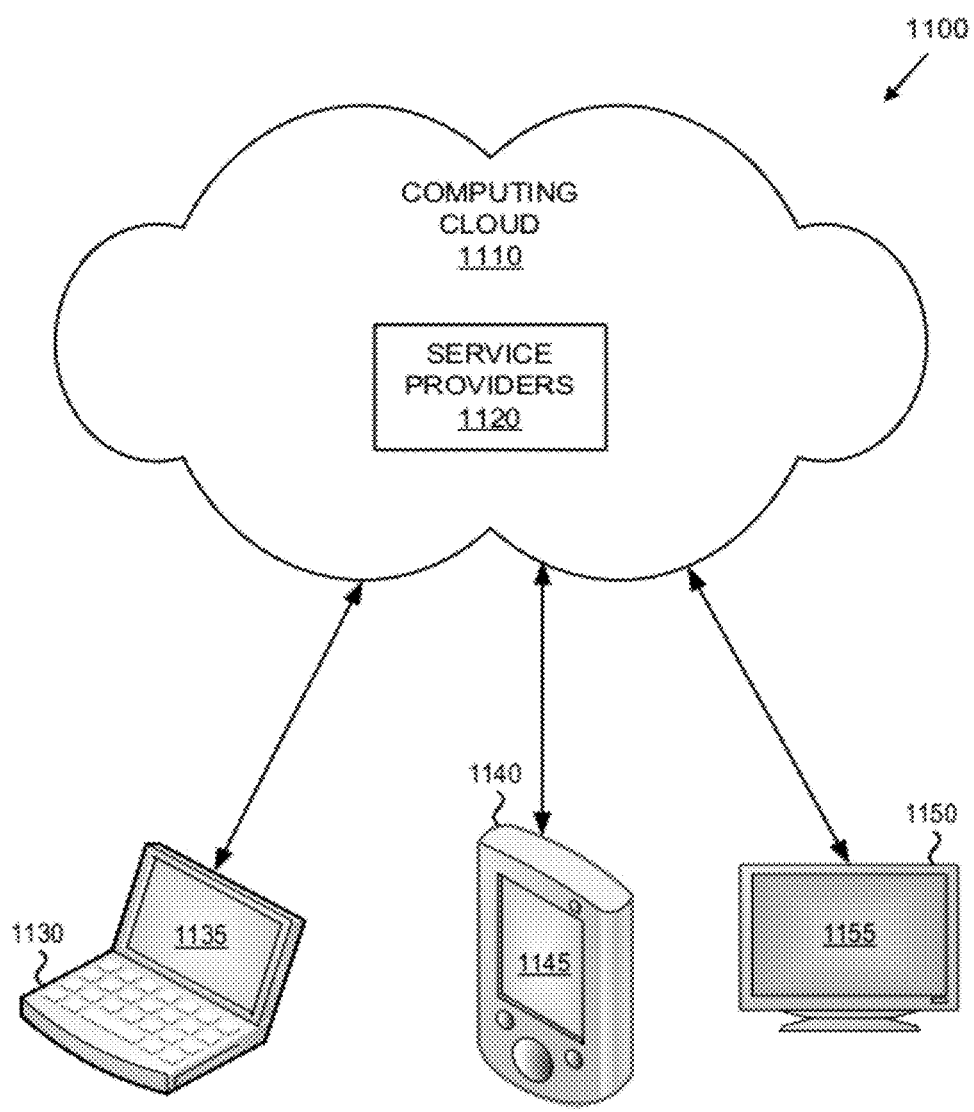
FIG. 11 illustrates a generalized example of a suitable implementation environment for a mobile device connected to a computing cloud.

FIG. 11 illustrates a generalized example of a suitable implementation environment 1100 in which described embodiments, techniques, and technologies can be implemented.

In example environment 1100, various types of services (e.g., computing services) are provided by a computing cloud 1110. For example, the computing cloud 1110 can comprise a collection of computing devices, which can be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, and 1150) while other tasks (e.g., storage of data to be used in subsequent processing) can be performed in the cloud 1110.

In example environment 1100, the cloud 1110 provides services for connected devices 1130, 1140, and 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a wireless communication device screen 1145 (e.g., a small size screen). For example, connected device 1140 could be a mobile phone, smartphone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, or 1150 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touch screen capability of a particular connected device (e.g., connected devices 1130, 1140, and 1150).

In example environment 1100, the cloud 1110 provides the technologies and solutions described herein to the various connected devices 1130, 1140, and 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, and 1150 and/or their respective users). In addition, data identifying one or more of the connected devices 1130, 1140, and 1150 can be used as context data in order to select media data for slideshow applications relevant for the respective connected devices.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide a better user experience with wireless communication devices, including wireless communication devices such as smartphones.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of performing a client-side slideshow application on a wireless communication device configured to have a private mode and a non-private mode, the method comprising:
   responsive to detecting that the wireless communication device is connected to a charging device:
      initiating a search of user history data to select media data relevant to a user of the wireless communication device, the user history data including history data associated with a frequency with which the user visits online content associated with at least one third-party user;
      transmitting a request for the selected media data via a computer network;
      receiving, via the computer network, the selected media data, the selected media data being selected based at least in part on the search of the user history data; and
      displaying at least a portion of the selected media data sequentially using the slideshow application on the wireless communication device, wherein:
         when the wireless communication device is in the non-private mode, then the displaying does not comprise displaying selected media data that does not have a privacy tag designation, and
         when the wireless communication device is in the private mode, then the displaying comprises displaying at least one selected media data that has a privacy tag designation.

2. The method of claim 1, further comprising adding at least one image stored locally on the wireless communication device to the selected media data, wherein the displaying comprises displaying at least one locally-stored image and at least one image of the received selected media data.

3. A method comprising:
   responsive to detecting that a wireless communication device is connected to a charging device:
   initiating a search of user history data to select media data relevant to a user of the wireless communication device;
   determining whether the wireless communication device is authenticated with an online application; and
   based on the determining:
      when the wireless communication device is authenticated with the online application, receiving media data from the online application,
      when the wireless communication device is not authenticated to the online application, receiving media data from local storage coupled to the wireless communication device but not from the online application, and
   displaying at least a portion of the selected media data sequentially using a slideshow application on the wireless communication device, wherein:
      when the wireless communication device is in a non-private mode, then the displaying does not comprise displaying selected media data that does not have a privacy tag designation, and
      when the wireless communication device is in a private mode, then the displaying comprises displaying at least one selected media data that has a privacy tag designation.

4. The method of claim 1, further comprising playing back local media data stored on the wireless communication device.

5. A method of performing a client-side slideshow application on a wireless communication device, comprising:
   based on detecting that the wireless communication device is connected to a charging device, automatically invoking the slideshow application, wherein the slideshow application is operable to display a series of images using the wireless communication device;
   transmitting a request for images via a computer network, the request comprising user history data;
   receiving, via the computer network, the series of images, wherein the images in the series of images are selected based at least in part on the user history data transmitted with the request;
   adding at least one image from the series of images to an image playlist; and
   checking whether the wireless communication device is connected to a charging device, and based on the checking, displaying at least a portion of the image playlist sequentially using the slideshow application on the wireless communication device, wherein:
      when a charging device is detected to be connected to the wireless communication device, the displaying of the image playlist occurs more frequently than when the wireless communication device is detected not to be connected to the charging device, and
      when a charging device is not detected connected to the wireless communication device, the displaying of the image playlist occurs less frequently than when the wireless communication device is detected to be connected to the charging device.

6. The method of claim 1, wherein the slideshow application is operable to playback still images, video images, or photo and video images on a display coupled to the wireless communication device.

7. The method of claim 6, wherein the display is not mechanically coupled to the wireless communication device.

8. The method of claim 1, wherein the detecting is based on at least one of the following criteria:
   whether the wireless communication device is connected to a charging device;
   whether the wireless communication device is in an idle period for a predetermined period of time;
   whether the wireless communication device has access to a non-empty set of media data; and
   whether the slideshow application has been previously enabled by a user setting.

9. The method of claim 1, further comprising playing back media data using the slideshow application based on an orientation of the wireless communication device, wherein:
   when the orientation is determined to be a first orientation, playing back at least one still image and at least one video image, and
   when the orientation is determined to be a second orientation, playing back one or more still images but not playing back any video images.

10. One or more computer-readable storage devices or memory storing computer-readable instructions that when executed by a computer, cause the computer to perform a method, the method comprising:
based on detecting that a wireless communication device is connected to a charging device:
automatically invoking a slideshow application operable to display a series of images using the wireless communication device, the slideshow application having an interactive mode and a photo frame mode;
automatically transmitting a request for images via a computer network, the request submitted to search data for one or more third-party users having a friend connection to a user of the wireless communication device an online application;
receiving, via the computer network, a series of images, at least a portion of the received images being designated as private;
based on the slideshow being in the interactive mode, displaying at least one of the private images using the slideshow application on the wireless communication device; and
based on the slideshow being in the photo frame mode, displaying at least one of the series of images, but not displaying any of the images designated as private.

11. The method of claim 1, wherein the user history data includes data based on previous communication between a user of the wireless communication device and other third-party users of a social network application.

12. The method of claim 1, further comprising, based on the request, searching first data associated with the wireless communication device, the first data including data associating a member of a social network with one or more of the other third-party users of the social network, producing search results, wherein the selected media data is selected based at least in part on the search results.

13. The computer-readable storage devices or memory of claim 10, wherein the search data associates the device user with one or more of the other third-party users by a friend connection created on a social networking site.

14. The method of claim 1, wherein the history data includes history data associated with sending or receiving messages to or from the user and at least one of the other third-party users, wherein the messages include at least one or more of the following: voice calls, voice mails, instant messages, SMS messages, electronic mail, web browsing, or social networking.

15. The computer-readable storage devices or memory of claim 10, wherein the search data includes history data for communications to or from the user and at least one of the third-party users.

16. The computer-readable storage devices or memory of claim 10, wherein the search data includes history data associated with sending or receiving messages to or from the user and at least one of the third-party users, wherein the messages include at least one or more of the following: voice calls, voice mails, instant messages, SMS messages, electronic mail, web browsing, or social networking.

17. The computer-readable storage devices or memory of claim 10, wherein the search data includes history data associated with a frequency with which the user visits online content associated with at least one of the third-party users.

18. The computer-readable storage devices or memory of claim 10, wherein the method further comprises:
receiving calendar entry data associated with the user, wherein the calendar entry data includes appointment data associated with the user and the at least one of the third-party users; and
based on the received calendar entry data, performing the acts of transmitting the request, and displaying the at least a portion of the series of images.

19. The method of claim 1, further comprising:
checking whether the wireless communication device is connected to a charging device, and based on the checking:
when a charging device is detected connected to the wireless communication device, then performing the displaying the at least a portion of the selected media more frequently than when the wireless communication device is not connected to the charging device, and
when a charging device is not detected connected to the wireless communication device, then performing the displaying the at least a portion of the selected media less frequently than when the wireless communication device is connected to the charging device.

20. The method of claim 5, wherein:
the wireless communication device is configured to have a private mode and a non-private mode, wherein:
when the wireless communication device is in the non-private mode, then the displaying of the image playlist does not comprise displaying selected media data that does not have a privacy tag designation, and
when the wireless communication device is in the private mode, then the displaying of the image playlist comprises displaying at least one selected media data that has a privacy tag designation.

21. The method of claim 1, wherein:
the slideshow application is further configured to have an interactive mode and a photo frame mode;
based on the slideshow being in the interactive mode, the wireless communication device is put in the non-private mode;
based on the slideshow being in the photo frame mode; the wireless communication device is put in the private mode; and
the search includes a request to search data for one or more third-party users having a friend connection to the user of the wireless communication device.

22. The method of claim 3, further comprising adding at least one image stored locally on the wireless communication device to the selected media data, wherein the displaying comprises displaying at least one locally-stored image and at least one image of the received media data.

23. The method of claim 3, wherein the user history data includes data based on previous communication between a user of the wireless communication device and other third-party users of a social network application.

24. The method of claim 5, wherein the search data includes history data associated with a frequency with which the user visits online content associated with at least one of the third-party users.

* * * * *